(12) United States Patent
Padget et al.

(10) Patent No.: US 10,493,579 B2
(45) Date of Patent: Dec. 3, 2019

(54) DUST COLLECTION SYSTEM FOR A ROTARY POWER TOOL

(71) Applicants: Robert Bosch Tool Corporation, Broadview, IL (US); Robert Bosch GmbH, Stuttgart (DE)

(72) Inventors: Bradley D. Padget, Huntley, IL (US); Daniel Blythe, Palatine, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 326 days.

(21) Appl. No.: 15/227,771

(22) Filed: Aug. 3, 2016

(65) Prior Publication Data

US 2018/0036852 A1   Feb. 8, 2018

(51) Int. Cl.
*B23Q 11/00* (2006.01)

(52) U.S. Cl.
CPC ...... *B23Q 11/0071* (2013.01); *B23Q 11/0046* (2013.01)

(58) Field of Classification Search
CPC ............ B23Q 11/0046; B23Q 11/0067; B23Q 11/0071
USPC .... 173/20, 29, 178, 48, 47, 21, 7, 131, 132, 173/170–171, 198
See application file for complete search history.

(56) References Cited

U.S. PATENT DOCUMENTS

| | | | | |
|---|---|---|---|---|
| 3,724,561 A | * | 4/1973 | Merrels | B25F 3/00 173/50 |
| 3,735,824 A | * | 5/1973 | Astrom | B23Q 1/015 175/213 |
| 4,124,956 A | * | 11/1978 | Levinson | B24B 55/102 451/358 |
| 4,184,226 A | * | 1/1980 | Loevenich | B23Q 11/0046 15/339 |
| 4,205,728 A | * | 6/1980 | Gloor | B23Q 11/0046 175/209 |
| 4,207,953 A | * | 6/1980 | Reibetanz | B23B 49/006 173/21 |
| 4,215,601 A | * | 8/1980 | Mann | B25B 27/00 81/57.13 |

(Continued)

FOREIGN PATENT DOCUMENTS

| EP | 1338386 A2 | 8/2003 |
|---|---|---|
| EP | 2591878 A1 | 5/2013 |

(Continued)

OTHER PUBLICATIONS

International Search Report corresponding to International Patent Application No. PCT/EP2017/068597 (6 pages).

*Primary Examiner* — Robert F Long

(74) *Attorney, Agent, or Firm* — Maginot, Moore & Beck LLP

(57) ABSTRACT

A dust collection system for a rotary power tool, which has a flexible shaft connected to a handpiece, includes a vacuum blower configured to generate a negative pressure and a connecting hose defining a first void region fluidly connected to the blower and which has the negative pressure. The connecting hose is configured to extend along a first length of the flexible shaft. The dust collection system further comprises a nozzle portion defining a second void region fluidly connected to the first void region and which has the negative pressure, the nozzle portion being configured to extend along a second length of the handpiece.

18 Claims, 5 Drawing Sheets

(56) References Cited

U.S. PATENT DOCUMENTS

| | | | | |
|---|---|---|---|---|
| 4,330,279 A * | 5/1982 | Heil | A61C 1/052 | 433/126 |
| 4,344,606 A * | 8/1982 | Dillon | B23K 7/08 | 266/66 |
| 4,361,957 A * | 12/1982 | Krotz | B08B 15/04 | 227/156 |
| 4,574,432 A * | 3/1986 | Jacob | A22C 21/02 | 452/101 |
| 4,608,017 A * | 8/1986 | Sadohara | A61C 5/40 | 433/81 |
| 4,646,738 A * | 3/1987 | Trott | A61B 17/32002 | 600/565 |
| 4,722,685 A * | 2/1988 | de Estrada | A61D 5/00 | 433/1 |
| 4,841,643 A * | 6/1989 | Colella | B23D 51/02 | 30/393 |
| 4,890,779 A * | 1/1990 | Giannuzzi | F16B 19/004 | 227/139 |
| 4,989,323 A * | 2/1991 | Casper | A01D 34/902 | 30/276 |
| 5,025,559 A * | 6/1991 | McCullough | B26B 25/002 | 30/1 |
| 5,034,041 A * | 7/1991 | Austin | B23Q 11/0046 | 144/252.1 |
| 5,069,695 A * | 12/1991 | Austin | B23Q 11/0046 | 144/252.1 |
| 5,090,499 A * | 2/1992 | Cuneo | B23Q 11/0046 | 173/75 |
| 5,199,501 A * | 4/1993 | Kluber | B23Q 11/0046 | 173/171 |
| 5,239,783 A * | 8/1993 | Matechuk | B24B 7/184 | 451/354 |
| 5,265,340 A * | 11/1993 | Nitz | B23D 59/006 | 30/166.3 |
| 5,423,799 A * | 6/1995 | Shiu | A61B 17/320758 | 606/159 |
| 5,467,835 A * | 11/1995 | Obermeier | B23Q 11/0046 | 173/75 |
| 5,645,540 A * | 7/1997 | Henniges | A61M 1/0023 | 604/118 |
| 5,653,591 A * | 8/1997 | Loge | A61C 17/20 | 433/118 |
| 5,795,216 A * | 8/1998 | Graves | B24B 55/102 | 451/356 |
| 5,820,464 A * | 10/1998 | Parlato | F16C 1/04 | 464/58 |
| 6,027,399 A * | 2/2000 | Stewart | B24B 23/02 | 451/353 |
| 6,041,462 A * | 3/2000 | Marques | A46B 13/008 | 134/140 |
| 6,053,674 A * | 4/2000 | Thompson | B23Q 11/0046 | 175/209 |
| 6,315,557 B1 * | 11/2001 | Messick | A61C 1/0015 | 433/82 |
| 6,332,891 B1 * | 12/2001 | Himes | A61B 90/36 | 606/130 |
| 6,451,017 B1 * | 9/2002 | Moutafis | A61B 17/32037 | 604/35 |
| 6,500,057 B1 * | 12/2002 | Medina | B24B 7/184 | 451/354 |
| 6,814,157 B2 | 11/2004 | Maras | | |
| 7,014,546 B1 | 3/2006 | Birk | | |
| 7,178,217 B2 * | 2/2007 | Barnett | B23C 3/30 | 29/557 |
| 7,220,174 B2 * | 5/2007 | Phillips | B24B 7/184 | 451/354 |
| 7,238,021 B1 * | 7/2007 | Johnson | A61C 1/16 | 433/1 |
| 7,281,886 B2 * | 10/2007 | Stoerig | B23Q 11/0046 | 175/213 |
| 7,549,913 B2 * | 6/2009 | Weiford | B24B 7/184 | 451/354 |
| 7,676,882 B1 * | 3/2010 | Safiol | A47L 13/52 | 15/257.1 |
| 7,905,896 B2 * | 3/2011 | Straub | A61B 17/320783 | 606/170 |
| 8,342,782 B2 * | 1/2013 | Nishikawa | B23Q 11/006 | 173/198 |
| D678,028 S * | 3/2013 | Rosenau | D8/70 | |
| 8,529,170 B2 * | 9/2013 | Everington, Jr. | B23Q 11/0046 | 408/67 |
| 9,579,762 B2 * | 2/2017 | Sullivan | B23Q 11/0046 | |
| 9,981,360 B2 * | 5/2018 | Roeck | B24B 23/02 | |
| 2001/0038799 A1 * | 11/2001 | Silver | A61M 1/06 | 417/515 |
| 2002/0024886 A1 * | 2/2002 | Sherez | B25F 3/00 | 366/349 |
| 2002/0154960 A1 * | 10/2002 | Lin | B23Q 11/0046 | 408/67 |
| 2002/0169467 A1 * | 11/2002 | Heitzmann | A61B 17/320758 | 606/159 |
| 2003/0040764 A1 * | 2/2003 | Adams | A61B 1/00154 | 606/170 |
| 2003/0155141 A1 * | 8/2003 | Maras | B23B 45/005 | 173/29 |
| 2004/0020671 A1 * | 2/2004 | Lamprecht | B23Q 11/0046 | 173/217 |
| 2004/0060145 A1 * | 4/2004 | Hayama | A47L 7/0085 | 15/339 |
| 2005/0000052 A1 * | 1/2005 | Byles | A47L 9/02 | 15/314 |
| 2005/0217452 A1 * | 10/2005 | McDonnell | B23D 45/16 | 83/663 |
| 2005/0268427 A1 * | 12/2005 | Britz | A47L 9/102 | 15/339 |
| 2007/0193759 A1 * | 8/2007 | Sweig | B25D 17/20 | 173/198 |
| 2007/0219484 A1 * | 9/2007 | Straub | A61B 17/320783 | 604/35 |
| 2008/0202781 A1 * | 8/2008 | Nishikawa | B23Q 11/0046 | 173/104 |
| 2009/0183887 A1 * | 7/2009 | Baber | B23B 45/005 | 173/1 |
| 2010/0042104 A1 * | 2/2010 | Kota | A61B 17/1631 | 606/79 |
| 2010/0155095 A1 * | 6/2010 | Furusawa | B23Q 11/0046 | 173/198 |
| 2011/0008118 A1 * | 1/2011 | Yoshikane | B23Q 11/0046 | 408/67 |
| 2012/0029281 A1 * | 2/2012 | Frassica | A61B 1/00082 | 600/114 |
| 2012/0063856 A1 * | 3/2012 | Miwa | B23Q 11/0046 | 408/67 |
| 2012/0121354 A1 * | 5/2012 | Dickey | B23B 31/02 | 409/131 |
| 2012/0318553 A1 * | 12/2012 | Chen | B23Q 11/0046 | 173/198 |
| 2013/0115863 A1 * | 5/2013 | Mizutani | B24B 55/10 | 451/456 |
| 2014/0008087 A1 * | 1/2014 | Brown | B25F 3/00 | 173/1 |
| 2014/0138114 A1 * | 5/2014 | Takeuchi | B23Q 11/0046 | 173/198 |
| 2014/0304939 A1 * | 10/2014 | Suzuki | A47L 7/0095 | 15/339 |
| 2015/0014291 A1 | 1/2015 | Holmes et al. | | |
| 2015/0152704 A1 * | 6/2015 | Tunget | E21B 33/128 | 166/254.2 |
| 2017/0087707 A1 * | 3/2017 | Appel | B23B 47/34 | |
| 2018/0125313 A1 * | 5/2018 | King, Jr. | A47L 7/0095 | |

FOREIGN PATENT DOCUMENTS

| | | | |
|---|---|---|---|
| WO | 2010120322 A1 | 10/2010 | |
| WO | WO 2010120322 A1 * | 10/2010 | B23D 59/006 |

\* cited by examiner

DUST COLLECTION SYSTEM FOR A ROTARY POWER TOOL

TECHNICAL FIELD

This disclosure relates generally to power tools, and more particularly to dust collection systems for rotary power tools.

BACKGROUND

In general, rotary power tools are light-weight, handheld power tools capable of being equipped with a variety of accessory tools and attachments, such as cutting blades, sanding discs, grinding tools, and many others. These types of tools typically include a generally cylindrically-shaped main body that serves as an enclosure for an electric motor as well as a hand grip for the tool. The electric motor drives an output shaft to rotate at high speeds. The output shaft is equipped with an accessory attachment system that enables accessory tools to be releasably secured to the power tool.

In some rotary tools, known as "flexible-shaft" rotary tools, the motor is located in a motor housing separate from the body of the tool. The motor enclosure is attached to the main body of the tool via a flexible shaft, which includes a plurality of rotatable components that transmit the rotational motion generated by the motor to the output shaft of the rotary tool.

Due to the light weight of the tool body of flexible-shaft rotary tools, these tools are frequently used for carving. However, when carving or machining, the rotary tools produce dust and debris that the user has to constantly remove from the area of the workpiece being machined so as to not obscure the details being carved. In addition, the dust and debris leaves the work area dirty and can cause problems for respiration of the user. It would therefore be beneficial to provide a flexible-shaft rotary tool that reduces the dust and debris produced during machining.

SUMMARY

In one embodiment, a dust collection system for a rotary power tool, which has a flexible shaft connected to a handpiece, includes a vacuum blower configured to generate a negative pressure and a connecting hose defining a first void region fluidly connected to the blower and which has the negative pressure. The connecting hose is configured to extend along a first length of the flexible shaft. The dust collection system further comprises a nozzle portion defining a second void region fluidly connected to the first void region and which has the negative pressure, the nozzle portion being configured to extend along a second length of the handpiece.

In some embodiments of the dust collection system, the nozzle portion includes a nozzle body defining the second void region and an opening adjacent to a bit holder of the handpiece, the opening being fluidly connected to the second void region and having the negative pressure.

In another embodiment, the nozzle body includes an attachment member configured to connect the nozzle body to the handpiece, and the attachment member includes a threaded portion configured to engage a corresponding threaded portion of the handpiece.

In yet another embodiment, the connecting hose radially surrounds the first length of the flexible shaft and the first void region is defined radially between the flexible shaft and the connecting hose. In such an embodiment, the volume occupied by the connecting hose and the flexible shaft is advantageously reduced since the flexible hose is located within the connecting hose.

In a further embodiment, the nozzle portion includes a nozzle body enclosing the second length of the handpiece, the second void region being defined between the handpiece and the nozzle body.

In another embodiment, the nozzle body defines an opening configured to surround a portion of a tool bit holder of the handpiece, the opening being fluidly connected to the second void region and having the negative pressure.

In one embodiment, of the dust collection system further comprises a plurality of clips configured to connect the connecting hose to the flexible shaft along the first length of the flexible shaft.

In yet another embodiment, the dust collection system further comprises an adapter clip interposed between the connecting hose and a nozzle body of the nozzle portion, the adapter clip including at least one clip projection extending from a first portion of the adapter clip. The at least one clip projection being configured to receive the flexible shaft and releasably retain the flexible shaft.

In a further embodiment of the dust collection system, the first portion has an inner circumferential surface that engages the connecting hose and the adapter clip includes a second portion having an outer circumferential surface that engages an inner wall of the nozzle portion.

In some embodiments, the clip projection includes a fixed end at the first portion and a free end opposite the fixed end, the free end including a raised feature configured to engage the flexible shaft.

In another embodiment according to the disclosure, a rotary power tool comprises a motor configured to rotate an output shaft, a flexible shaft including a first end operably connected to the output shaft so as to rotate with the output shaft, and a handpiece including a bit holder configured to receive a tool bit, the bit holder being operatively connected to a second end of the flexible shaft so as to rotate with the flexible shaft. The rotary power tool further includes a dust collection system comprising a vacuum blower configured to generate a negative pressure and a connecting hose defining a first void region fluidly connected to the blower and which has the negative pressure, the connecting hose extending along a first length of the flexible shaft. The dust collection system further comprises a nozzle portion defining a second void region fluidly connected to the first void region and which has the negative pressure, the nozzle portion extending along a second length of the handpiece.

In one embodiment of the rotary power tool, the nozzle portion includes a nozzle body defining the second void region and defining an opening adjacent to the bit holder. The opening is fluidly connected to the second void region and has the negative pressure.

In yet another embodiment, the nozzle body includes an attachment member connecting the nozzle body to the handpiece, the attachment member including a threaded opening engaging a corresponding threaded portion of the handpiece.

In a further embodiment of the rotary power tool, the connecting hose radially surrounds the first length of the flexible shaft and the first void region is defined radially between the flexible shaft and the connecting hose.

In some embodiments of the rotary power tool, the nozzle portion includes a nozzle body enclosing the second length of the handpiece, and the second void region is defined between the handpiece and the nozzle body.

In one embodiment, the nozzle body defines an opening arranged surrounding a portion of the bit holder, and the opening is fluidly connected to the second void region and having the negative pressure.

Some embodiments of the rotary power tool further comprise a plurality of clips connecting the connecting hose to the flexible shaft along the first length of the flexible shaft.

In yet another embodiment, the dust collection system further comprises an adapter clip interposed between the connecting hose and a nozzle body of the nozzle portion. The adapter clip includes at least one clip projection extending from a first portion of the adapter clip and which releasably retains the flexible shaft.

In one embodiment of the rotary power tool, the first portion of the adapter clip has an inner circumferential surface that engages the connecting hose, and the adapter clip includes a second portion having an outer circumferential surface that engages an inner wall of the nozzle portion.

In some embodiments of the rotary power tool, the clip projection includes a fixed end at the first portion and a free end opposite the fixed end, the free end including a raised feature that engages the flexible shaft.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

As used herein, the term "approximately" is defined to refer to values within five percent less than or greater than the given value. As used herein, the term "adjacent" is defined to refer to two structures or elements that are located within one inch from one another.

Figure 1:
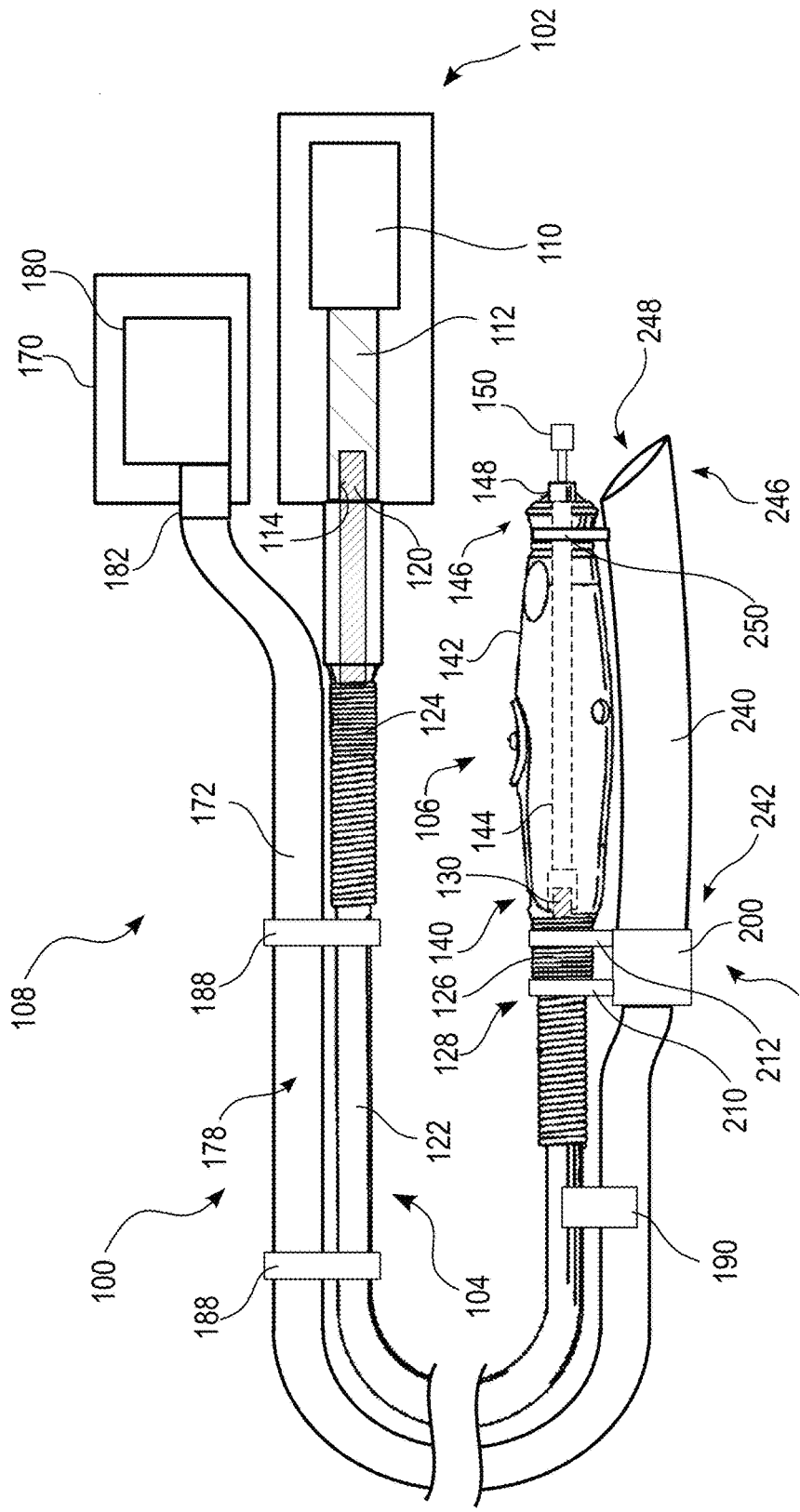
FIG. 1 is a schematic partial cutaway view of a flexible-shaft rotary tool having a dust collection system according to the disclosure.

FIG. 1 illustrates a flexible shaft rotary tool 100 having a motor housing 102, a flexible drive transmission shaft 104, a handpiece 106, and a dust collection system 108. The motor housing 102 includes an electric motor 110 (illustrated schematically), which is coupled to an axially-oriented drive shaft 112 having a noncircular recess 114 configured to couple with a noncircular and preferably square or rectangular-shaped drive shaft element 120 of the flexible drive shaft 104.

In some embodiments, the motor housing 102 is configured to hang on a movable rack or cart, while in other embodiments, the motor housing 102 is mounted to a wall or other fixed structure. In still further embodiments, the motor housing 102 is formed by an exterior housing of a conventional battery-powered or corded rotary tool having an internal motor, and the flexible shaft 104 attaches to the accessory tool holder of the conventional rotary tool.

The flexible shaft 104 includes the drive shaft element 120, which is rotatable within, and circumscribed by a sheath or casing 122, and a coil support (not shown) disposed between the drive shaft element 120 and the casing 122. In one embodiment, the drive shaft element 120 is formed of flexible metal and the casing 122 is formed durable, inexpensive, thermoformable plastic material such as polyvinylchloride (PVC). In other embodiments, however, other desired materials are used for the drive shaft element 120 and the casing 122. Coiled, spring-like bend protectors 124, 126 are respectively located at opposite ends of the flexible shaft 104 to protect the flexible shaft 104 against sharp bends or kinks. In some embodiments, the connection between the flexible shaft 104 and the motor housing 102 is separable by a user without additional tools. In one particular embodiment, the motor housing 102 or the flexible shaft 104 includes a quick-disconnect system configured to enable easy removal of the flexible shaft 104 from the motor housing 102.

At the handpiece end 128 of the flexible shaft 104, the bend protector 126 engages a first end 140 of a handpiece housing 142 of the handpiece 106. The handpiece 106 also includes a driven shaft 144 arranged in the handpiece housing 142. The driven shaft 144 is rotationally fixed to the handpiece end 130 of the drive shaft element 120 and extends to a second, working end 146 of the handpiece 106. The drive shaft element 120 drives the driven shaft 144 to rotate a bit holder 148, in which a working attachment or tool bit 150, such as, for example, a drill bit, a polishing disk, a grinding wheel, a sanding wheel, a cutting wheel or bit, a wire brush, a saw or other rotary tool attachment, is fixed.

The dust collection system 108 includes a vacuum housing 170, a connecting hose 172, and a nozzle portion 174. The vacuum housing 170 encloses a vacuum blower 180, which includes a motor (not shown) operatively connected to a fan (not shown) that produces a negative pressure in an outlet connector 182 that is attached to the connecting hose 172.

In the illustrated embodiment, the vacuum housing 170 is a separate housing from the motor housing 102. For example, in one embodiment, the vacuum housing 170 may be a conventional mobile or fixed workshop vacuum to which the connecting hose 172 is removably attached via the outlet connector 182. In another embodiment, the vacuum housing 170 is configured for use specifically with the connecting hose 172, and may be fixedly connected to the connecting hose 172 via the outlet connector 182. In one embodiment, the outlet connector is connected to a larger vacuum hose (not shown), which is connected via a hose adapter to the connecting hose 172.

In another embodiment, the vacuum housing 170 and the motor housing 102 are integrated with one another, such that a single housing encloses both the electric motor 110 and the vacuum blower 180. In a further embodiment, the electric motor 110 is operatively connected to the vacuum blower 180 and rotates the fan of the vacuum blower 180 to generate the negative pressure in the outlet connector 182. In such an embodiment, the dust collection system does not include a separate vacuum motor.

Figure 2:
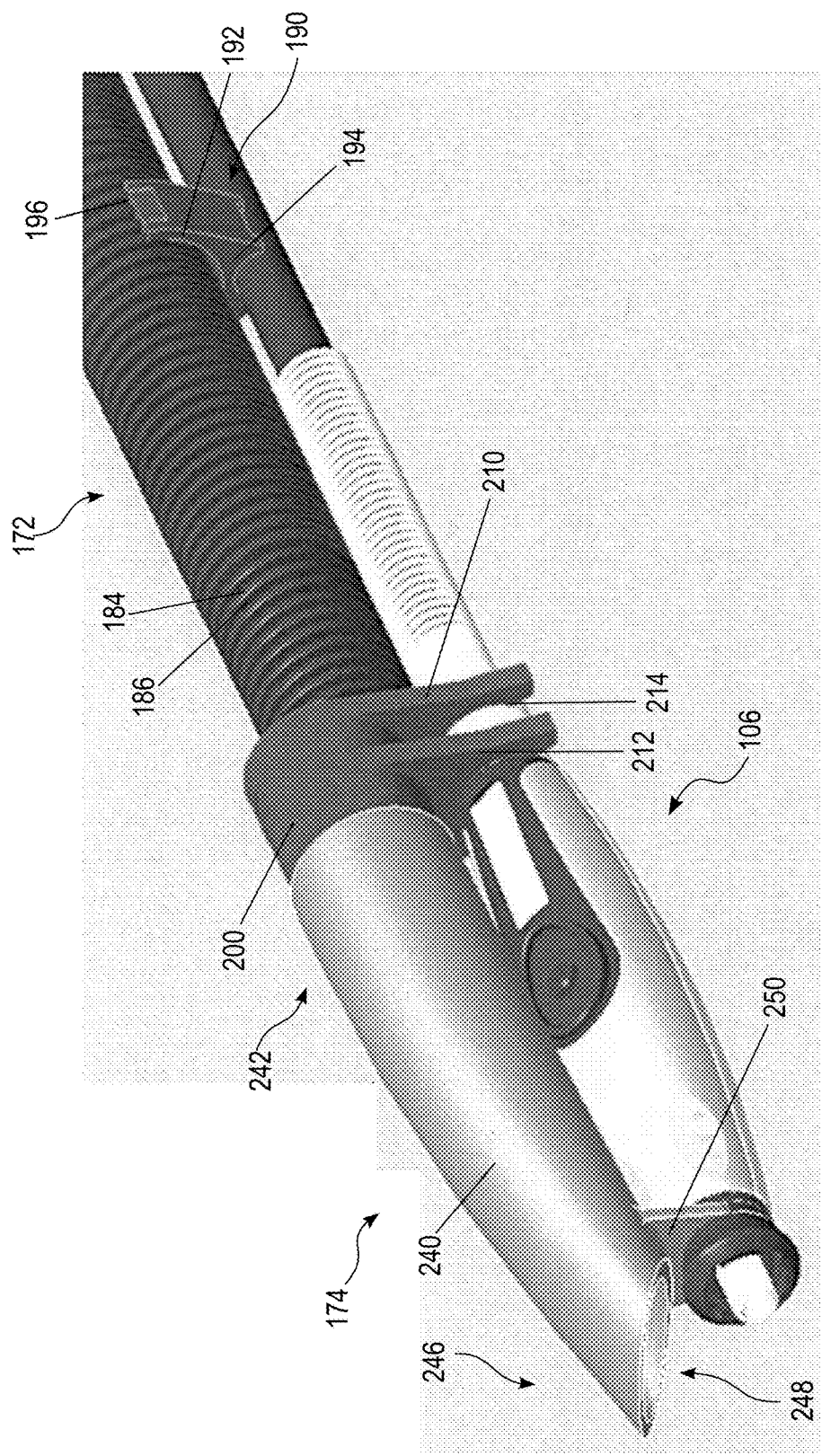
FIG. 2 is a side perspective detail view of the nozzle portion of the dust collection system and the handpiece of the rotary tool of FIG. 1.

The connecting hose 172 is flexible and extends along the flexible shaft 104 from the vacuum housing 170 to the nozzle portion 174. The interior of the connecting hose 172 defines a void region 178 that is fluidly connected to the outlet connector 182 of the vacuum housing 170 such that the negative pressure in the outlet connector 182 is also present in the void region 178. In one embodiment, the connecting hose 172 is approximately one inch in diameter, though other desired hose sizes are used in other embodiments. As illustrated in FIG. 2, in some embodiments, the connecting hose 172 includes a plurality of ribs 184 separated from one another by a plurality of recesses 186 to facilitate the expansion, contraction, and flexibility of the connecting hose 172.

The dust collection system 108 further includes a plurality of clips 188, 190 spaced along the length of the connecting hose 172. The clips 188, 190 are connected to and extend at least partially around both the connecting hose 172 and the flexible shaft 104 so as to attach the connecting hose 172 to the flexible shaft 104 and maintain the connecting hose 172 adjacent to the flexible shaft 104 along a length of the flexible shaft 104.

In some embodiments, the connecting hose 172 is adjacent to the flexible shaft 104 along the entire length of the flexible shaft 104. In one particular embodiment, the connecting hose 172 is adjacent to the flexible shaft 104 along approximately 90% of the entire length of the flexible shaft 104. In another embodiment, the connecting hose is adjacent to the flexible shaft 104 along approximately 75% of the entire length of the flexible shaft 104.

The clips 188 illustrated in FIG. 1 extend entirely around a portion of both the flexible shaft 104 and the connecting hose 172. In some embodiments, the clips 188 may be configured to extend only around a portion of each of the flexible shaft 104 and the connecting hose, similar to clip 190 described below, to facilitate easy disconnecting of the flexible shaft 104 from the connecting hose 172.

A detailed view of the clip 190 is seen in FIG. 2 attached near the handpiece end 128 of the flexible shaft 104. The clip 190 includes a first portion 192 connected to the connecting hose 172 and a second portion 194 connected to the flexible shaft 104. The first portion 192 is formed generally in the shape of a semicircle having an inner diameter that is approximately equal to the outer diameter of the connecting hose 172. The first portion 192 further includes a plurality of projections 196 extending radially inwardly into the recesses 186 of the connecting hose 172 so as to connect the first portion 192 to the connecting hose 172.

The second portion 194 of the clip 190 is formed generally as a semicircle having an inner diameter that is approximately equal to the outer diameter of the casing 122 of the flexible shaft 104. In the illustrated embodiment, the second portion 194 of the clip 190 is prestressed so as to exert a holding force on the casing 122 to retain the clip 190 connected to the casing 122. Since the clip 190 is not positively connected to either the flexible shaft 104 or the connecting hose 172, the user can easily disconnect the connecting hose 172 from the flexible shaft 104.

Figure 3:
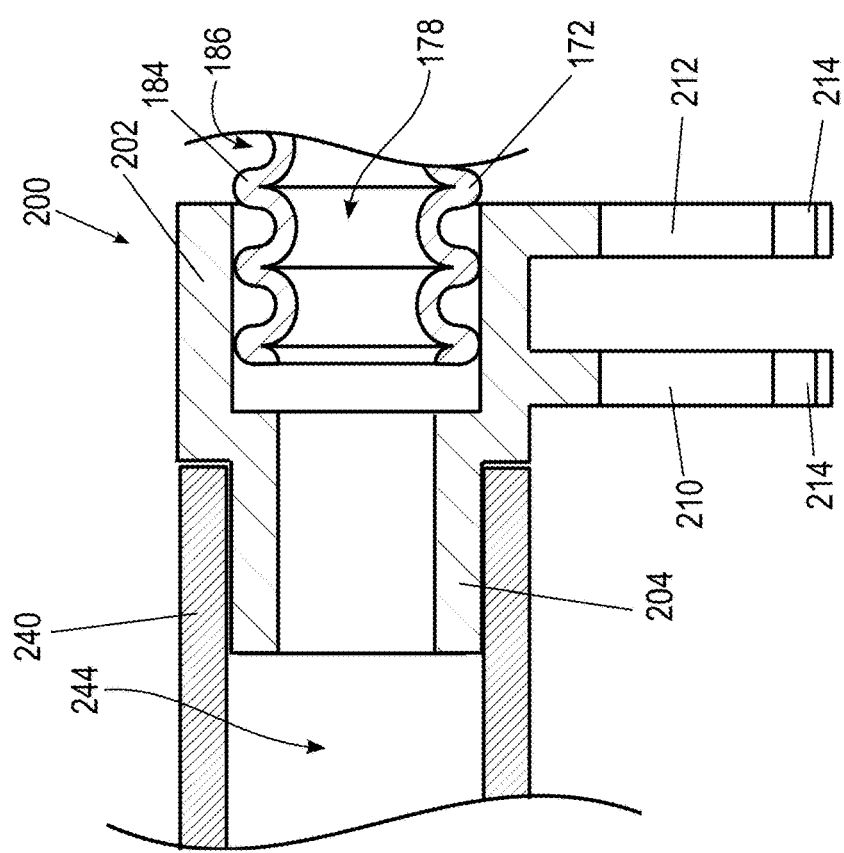
FIG. 3 is a cross-sectional view of an adapter clip connecting the connecting hose to the nozzle body of the dust collection system of FIG. 1.

The dust collection system 108 further includes an adapter clip 200 at the interface between the connecting hose 172 and the nozzle portion 174. With continued reference to FIG. 2 and further reference to FIG. 3, the adapter clip 200 includes a first portion 202 and a second portion 204, each of which has a generally annular cross-section. The first portion 202 defines a cylindrical cavity 206, in which the connecting hose 172 is received. In some embodiments, the first portion 202 includes one or more projections (not shown) extending radially inwardly from the inner wall into one or more of the recesses 186 to engage one or more of the ribs 184 of the connecting hose 172 to retain the connecting hose 172 fixed to the adapter clip 200.

The second portion 204 projects into the interior of the nozzle body 240 (discussed in detail below) of the nozzle portion 174 of the dust collection system 108. The inner wall of the nozzle body 240 engages the outer wall of the second portion 204 of the adapter clip 200 so as to retain the nozzle body 240 in connection with the second portion 204 of the adapter clip 200 in a form fitting connection. The reader should appreciate, however, that in other embodiments the adapter clip 200 is locked with, clamped to, integrated with, or otherwise suitable connected to the nozzle body 240.

The adapter clip also 200 also includes two clip projections 210, 212 extending in a direction generally toward the flexible shaft 104, substantially perpendicular to the central axis of the adapter clip. The clip projections 210, 212 each have an arcuate shape with a raised feature 214, for example a bump, near the free end of the clip projections 210, 212. The raised features 214 on each side of the clip projections 210, 212 are configured to releasably clamp the casing 122 of the flexible shaft 104 to the adapter clip 200, thereby retaining the flexible shaft 104 adjacent to the connecting hose 172.

The nozzle portion 174 of the dust collection system 108 includes the nozzle body 240, which is attached at a first end portion 242 to the second portion 204 of the adapter clip 200. The interior of the nozzle body 240 defines a nozzle void region 244 (FIG. 3), which is fluidly connected to the hose void region 178 of the connecting hose 172 in such a way that the negative pressure in the hose void region 178 is also present in the nozzle void region 244. The second end portion 246 of the nozzle body 240 defines a nozzle opening 248, through which dust and debris is pulled from the area adjacent the tool bit 150 to the nozzle void region 244. In various embodiments of the nozzle body 240, the nozzle opening 248 is shaped as a circular opening, an angled circular opening (illustrated in FIGS. 1, 2, and 4), a tapering opening, a slotted opening, an arcuate opening, an annular opening, or any other desired opening size and shape.

Figure 4:
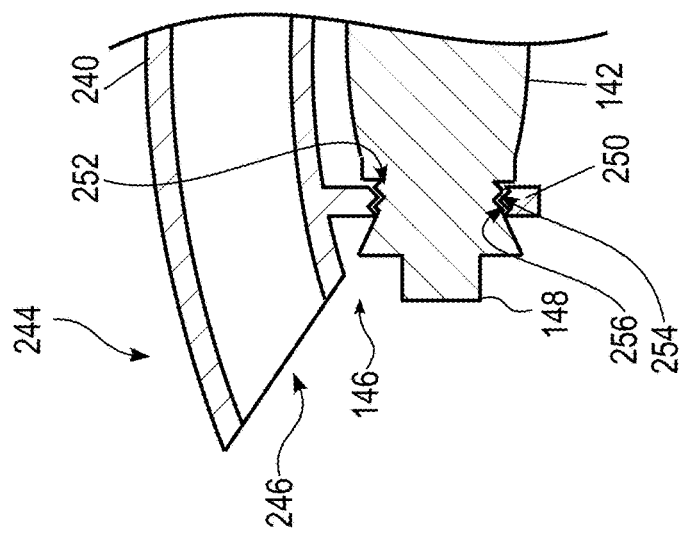
FIG. 4 is a cross-sectional view of the nozzle body having an attachment member.

Referring now to FIGS. 2 and 4, at the second end portion 246, the nozzle body 240 also includes an attachment member 250 extending around the working end 146 of the handpiece 140. The attachment member 250 projects around the working end 146 of the handpiece 140, defining an opening 252 surrounding a portion of the working end 146. In one embodiment, the attachment member 250 includes at least one screw thread 254, which is configured to matingly connect to screw threads 256 on the working end 146 of the handpiece 140. In another embodiment, the attachment member 250 is attached to a grip portion of the handpiece 140.

In use, the suction produced by the vacuum blower 180 pulls dust and debris machined from the workpiece through the nozzle opening 248, through the void region 244 of the nozzle body 240, the void region 178 of the connecting hose 172, and to the vacuum 172 where the dust is stored for subsequent disposal. Providing the nozzle opening 258 adjacent the tool bit 150 enables the vacuum pressure to pull dust and debris from the workpiece as the dust and debris is produced, keeping the work area clean and avoiding obscuring the user's view of the details of the workpiece.

Figure 5:
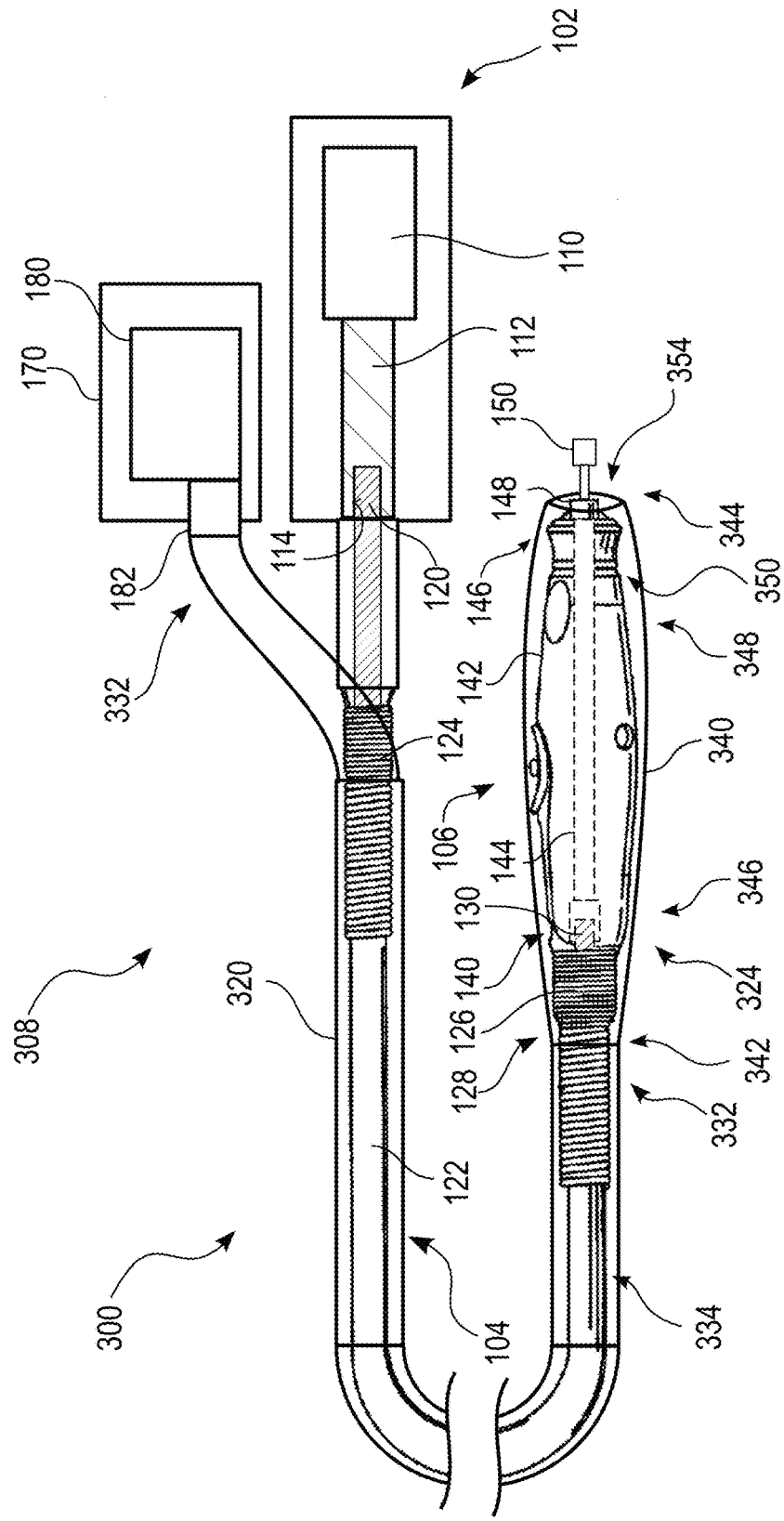
FIG. 5 is a schematic partial cutaway view of a flexible-shaft rotary tool having another dust collection system according to the disclosure.

FIG. 5 illustrates another embodiment of a rotary tool 300 having a dust collection system 308. The rotary tool 300 includes a motor housing 102, a flexible shaft 104, and a handpiece 106 configured similarly to the rotary tool 100 described above. In addition, similarly to the embodiment of FIGS. 1-4, the dust collection system 308 of the embodiment of FIG. 5 includes a vacuum motor housing 170, a connecting hose 320, and a nozzle portion 324. The vacuum motor housing 170 is configured in substantially the same manner as in the embodiment of FIGS. 1-4, with a vacuum blower 180 configured to produce suction in the outlet connector 182. In one embodiment, the vacuum blower 180 is integrated in the motor housing 120, and the vacuum connector 182 is positioned so as to connect around the outer circumference of the drive shaft element 120 of the flexible shaft 104.

The connecting hose 320 includes a first end 330 connected to the vacuum connector 182 and a second end 332 connected to the nozzle portion 324. The connecting hose 320 surrounds the flexible shaft 104 along the length of the flexible shaft 104. In some embodiments, the connecting hose 320 is formed by a plurality of ribs or projections (not shown), each of which is separated from adjacent projections by a recess (not shown), similar to the embodiment shown in FIGS. 2 and 3, so as to facilitate movement, expansion, and contraction of the connecting hose 320.

The interior of the connecting hose 320 defines a void region 334 having a generally annular cross-sectional shape surrounding the flexible shaft 104. The void region 334 is fluidly connected to the vacuum connector 182 within the connecting hose 320 in such a way that the negative pressure from the vacuum connector 182 also exists in the void region 334.

At the second end 332, the connecting hose 320 is attached to the nozzle portion 324 of the dust collection system 308. The nozzle portion 324 includes a nozzle body 340, which has a first end 342 adjacent the connecting hose 320 and a second end 344, or working end, opposite the connecting hose 320. In the illustrated embodiment, the nozzle body 340 has a first portion 346 that has a diameter that expands outwardly moving from the first end 342 of the nozzle body in a direction toward the second end 344. A second portion 348 of the nozzle body 340 has a diameter that decreases moving from the first portion 346 toward the second end 344. As a result, the shape of the nozzle body 340 generally conforms to the outer shape of the handpiece housing 142. A nozzle void region 350 is defined between the inner wall of the nozzle body 340 and the outer surface of the handpiece housing 142. The nozzle void region 350 is fluidly connected to the void region 344 of the connecting hose 320 such that the negative pressure in the connecting hose void region 344 is also present in the nozzle void region 350.

At the second end 344, the nozzle body 340 defines a dust collection opening 354 surrounding a portion of the bit holder 148 or the tool bit 150. The negative pressure present in the nozzle void region 350 pulls air, dust, and debris in the vicinity of the tool bit 150 into the dust collection opening 354, where the air, dust, and debris is transferred through the nozzle void region 350 and the connecting hose void region 344 and vacuum connector 182 to the vacuum housing 170, where the dust and debris is stored for subsequent disposal. The dust collection system 308 of the rotary tool 300 therefore enables dust and debris to be removed from the area of the tool bit 150, thereby providing a cleaner work area while the user is using the rotary tool 300 and reducing the cleaning required after use of the rotary tool 300.

Figure 7:
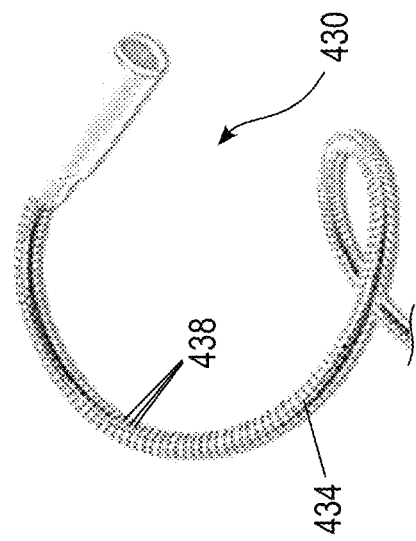
FIG. 7 is a side view of another connecting hose for use in the dust collection systems of FIG. 1 or FIG. 5.
Figure 6:
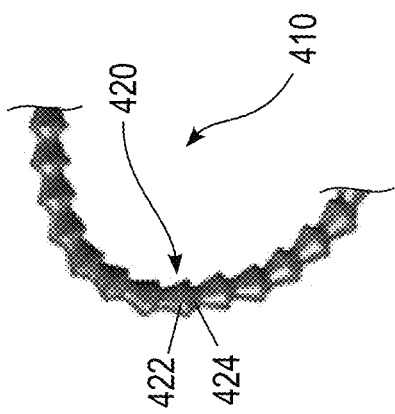
FIG. 6 is a side view of a connecting hose for use in the dust collection systems of FIG. 1 or FIG. 5.

FIGS. 6 and 7 illustrate two other embodiments of connecting hoses for use in place of the connecting hoses 172, 320 in the embodiments described above. The embodiment of FIG. 6 shows a connecting hose 410 having a plurality of segments 420, each of which includes a widened receiving portion 422 and a smaller recessed portion 424. The recessed portion 424 of each segment 420 is positioned in the receiving portion 422 of the adjacent segment 420 in such a way that the segments 420 articulate relative to one another. Thus, the connecting hose 410 is movable so as to remain adjacent to or surrounding the flexible shaft 104.

The embodiment of FIG. 7 is a connecting hose 430 having a metal sheath 434 with a plurality of short metal segments 438. Each of the metal segments 438 articulates relative to the adjacent segments 438 so that the entire connecting hose 430 is flexible. In some embodiments, the metal sheath 434 is formed of a flexible metal to provide additional mobility for the connecting hose 430.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A dust collection system for a rotary power tool having a flexible shaft connected to an elongated handpiece, said flexible shaft transmitting rotation from an output shaft of a motor of the rotary power tool to a bit holder of said handpiece, the dust collection system comprising:
   a vacuum blower configured to generate a negative pressure;
   a flexible connecting hose defining a first void region fluidly connected to the blower and which has the negative pressure, the connecting hose being configured to connect to and extend along a first length of the flexible shaft in such a way that the connecting hose remains connected to and extending along the first length when the flexible shaft is flexed; and
   a nozzle portion defining a second void region fluidly connected to the first void region and which has the negative pressure, the nozzle portion being configured to extend along and around a first length of the handpiece, said connecting hose being connected to the nozzle portion at a second end of the handpiece that is opposite a first end of the handpiece at which the bit holder is located,
   wherein the connecting hose radially surrounds the first length of the flexible shaft in such a way that cross-sections of an outer surface of the flexible shaft taken perpendicular to a longitudinal direction of the flexible shaft are entirely surrounded by the connecting hose, and the first void region is defined between the outer surface of the flexible shaft and an inner surface of the connecting hose.

2. The dust collection system of claim 1,
   wherein the nozzle portion includes a nozzle body defining the second void region and an opening adjacent to a bit holder of the handpiece, the opening being fluidly connected to the second void region and having the negative pressure.

3. The dust collection system of claim 2, wherein the nozzle portion includes an attachment member projecting from the nozzle body, the attachment member including a threaded portion configured to engage a corresponding threaded portion of the handpiece so as to removably connect the nozzle body to the handpiece.

4. The dust collection system of claim 1, wherein the nozzle portion includes a nozzle body enclosing the first length of the handpiece in such a way that cross-sections of an outer surface of the handpiece taken perpendicular to a longitudinal direction of the handpiece are entirely surrounded by the nozzle body, the second void region being defined between the outer surface of the handpiece and an inner surface of the nozzle body.

5. The dust collection system of claim 4, wherein the first length of the handpiece extends from the second end of the handpiece to an opening defined by the nozzle body that surrounds a portion of the bit holder of the handpiece, the opening being fluidly connected to the second void region and having the negative pressure.

6. The dust collection system of claim 1, further comprising:
a plurality of clips configured to connect the connecting hose to the flexible shaft along the first length of the flexible shaft.

7. The dust collection system of claim 1, further comprising:
an adapter clip interposed between the connecting hose and a nozzle body of the nozzle portion, the adapter clip including at least one clip projection extending from a first portion of the adapter clip, the at least one clip projection being configured to receive the flexible shaft and releasably retain the flexible shaft adjacent to the nozzle body.

8. The dust collection system of claim 7, wherein the first portion has an inner circumferential surface that engages the connecting hose and the adapter clip includes a second portion having an outer circumferential surface that engages an inner wall of the nozzle portion.

9. The dust collection system of claim 7, wherein the clip projection includes a fixed end at the first portion and a free end opposite the fixed end, the free end including a raised feature configured to engage the flexible shaft.

10. A rotary power tool comprising:
a motor configured to rotate a motor output shaft;
a flexible shaft including a first end operably connected to the motor output shaft so as to rotate with the motor output shaft, the flexible shaft transmitting rotational movement of the motor output shaft from the first end to a second end of the flexible shaft;
an elongated handpiece having a first handpiece end that includes a bit holder configured to receive a tool bit, the bit holder being operatively connected to the second end of the flexible shaft so as to rotate with the flexible shaft, the handpiece having a second opposite handpiece end at which the flexible shaft is connected to the handpiece; and
a dust collection system comprising:
a vacuum blower configured to generate a negative pressure;
a flexible connecting hose defining a first void region fluidly connected to the blower and which has the negative pressure, the connecting hose being connected to and extending along a first length of the flexible shaft in such a way that the connecting hose remains connected to and extending along the first length when the flexible shaft is flexed; and
a nozzle portion defining a second void region fluidly connected to the first void region and which has the negative pressure, the nozzle portion extending along and around a first length of the handpiece, the flexible connecting hose being connected to the nozzle portion at the second handpiece end of the handpiece,
wherein the connecting hose radially surrounds the first length of the flexible shaft in such a way that cross-sections of an outer surface of the flexible shaft taken perpendicular to a longitudinal direction of the flexible shaft are entirely surrounded by the connecting hose, and the first void region is defined between the outer surface of the flexible shaft and an inner surface of the connecting hose.

11. The rotary power tool of claim 10, wherein the nozzle portion includes a nozzle body defining the second void region and defining an opening adjacent to the bit holder, the opening being fluidly connected to the second void region and having the negative pressure.

12. The rotary power tool of claim 11, wherein the nozzle portion includes an attachment member projecting from the nozzle body, the attachment member including a threaded opening engaging a corresponding threaded portion of the handpiece so as to removably connect the nozzle body to the handpiece.

13. The rotary power tool of claim 10, wherein the nozzle portion includes a nozzle body enclosing the first length of the handpiece in such a way that cross-sections of an outer surface of the handpiece taken perpendicular to a longitudinal direction of the handpiece are entirely surrounded by the nozzle body, the second void region being defined between the outer surface of the handpiece and an inner surface of the nozzle body.

14. The rotary power tool of claim 13, wherein the first length of the handpiece extends from the second end of the handpiece to an opening defined by the nozzle body that surrounds a portion of the bit holder, the opening being fluidly connected to the second void region and having the negative pressure.

15. The rotary power tool of claim 10, further comprising:
a plurality of clips connecting the connecting hose to the flexible shaft along the first length of the flexible shaft.

16. The rotary power tool of claim 10, the dust collection system further comprising:
an adapter clip interposed between the connecting hose and a nozzle body of the nozzle portion, the adapter clip including at least one clip projection extending from a first portion of the adapter clip and releasably retaining the flexible shaft adjacent to the nozzle body.

17. The rotary power tool of claim 16, wherein the first portion of the adapter clip has an inner circumferential surface that engages the connecting hose, and the adapter clip includes a second portion having an outer circumferential surface that engages an inner wall of the nozzle portion.

18. The rotary power tool of claim 16, wherein the clip projection includes a fixed end at the first portion and a free end opposite the fixed end, the free end including a raised feature that engages the flexible shaft.

* * * * *